UNITED STATES PATENT OFFICE.

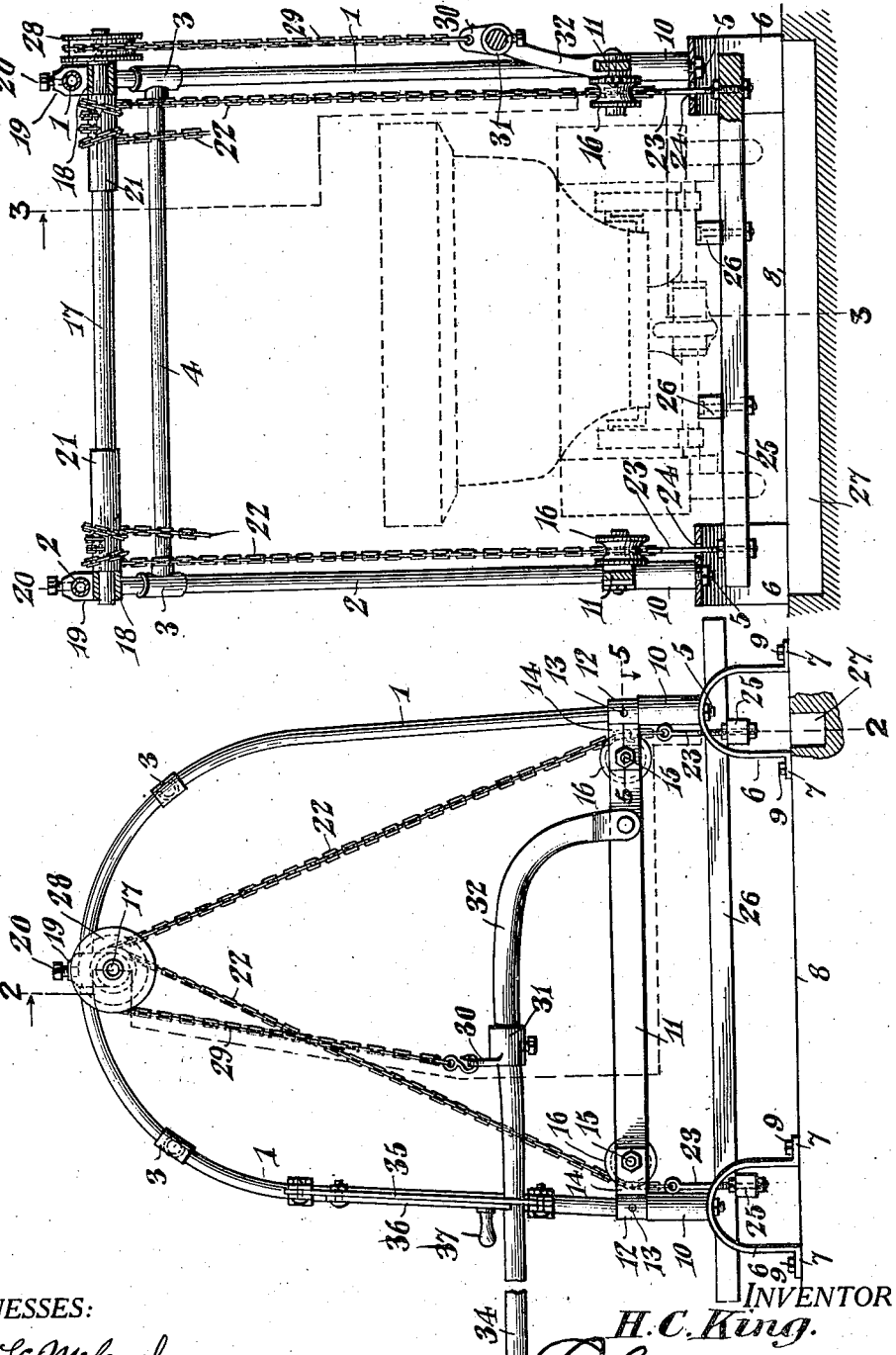

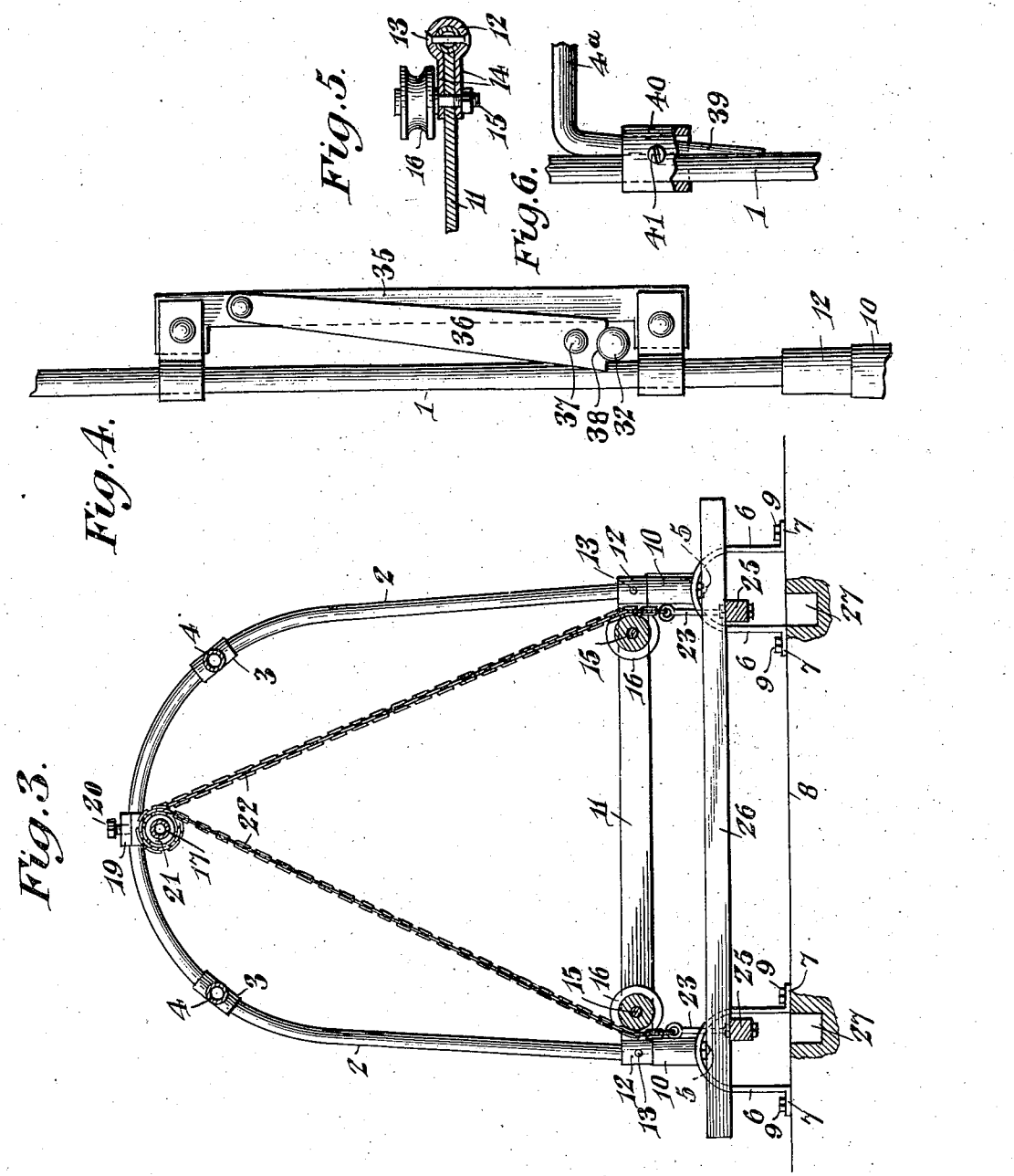

HENRY C. KING, OF WASHINGTON, KANSAS.

SUPPORTING DEVICE FOR AUTOMOBILES.

1,212,646.  Specification of Letters Patent.  Patented Jan. 16, 1917.

Application filed September 23, 1915. Serial No. 52,220.

*To all whom it may concern:*

Be it known that I, HENRY C. KING, a citizen of the United States, residing at Washington, in the county of Washington and State of Kansas, have invented a new and useful Supporting Device for Automobiles, of which the following is a specification.

This invention has reference to supporting devices for automobiles, and is designed to provide a support on to which an automobile may be readily moved, and when in position thereon raised in a manner to take the weight of the automobile from the tires, whereby injury to the tires due to the weight of the automobile is prevented.

When an automobile is stored for any considerable length of time, it is advisable to deflate the tires, in which case the tires should not be subjected to the weight of the automobile, wherefore it is customary to elevate the automobile sufficiently to have the tires free from engagement with the floor or the like upon which the automobile ordinarily stands.

In accordance with the present invention there is provided a framework which may be installed in any garage or other housing for an automobile, and the frame has a windlass thereon at a high point operable by a simple lever device within ready reach of a person standing on the floor and providing such leverage that a single person may readily elevate an automobile. Furthermore, the structure is of a character permitting an elevation of the automobile to an extent to provide for access beneath the automobile for repairs or other purposes in like manner to the usual repair pits provided in shops where automobiles are renovated.

The present invention is designed as an adjunct to a garage to be placed within the building in the usual path of the vehicle, and is more particularly useful in what may be termed private garages, as distinguished from those which accommodate a large number and variety of automobiles, although the invention is of use in the last-named type of garages.

The invention will be best understood from a consideration of the following detailed description, taken in connection with the accompanying drawings forming part of this specification, with the further understanding that while the drawings show a practical form of the invention, the latter is not confined to any strict conformity with the showing of the drawings, but may be changed and modified so long as such changes and modifications come within the scope of the appended claims.

In the drawings:—Figure 1 is a side elevation of an automobile elevating structure constructed in accordance with the present invention. Fig. 2 is a section on the line 2—2 of Fig. 1, and indicating an automobile in dotted lines. Fig. 3 is a section on the line 3—3 of Fig. 2. Fig. 4 is a detail elevation of a latch structure shown in Fig. 1. Fig. 5 is a section on the line 5—5 of Fig. 1. Fig. 6 is a view of a modified form of connection between the side frames of the structure.

Referring to the drawings there is shown a frame made up of two arch side members 1, 2, respectively. These arch members may each be made of piping in appropriate lengths and at suitable points the piping sections are connected together by T couplings 3, in turn connected together by cross pipes 4 serving as braces. The lower ends of the legs of each arch are connected, as by bolts 5, to basic arch supports 6 having feet 7 designed to rest upon a surface, such as a flooring, indicated at 8, to which the feet 7 are secured by screws 9 or otherwise. Each leg 1 adjacent to the support or the basic arch 5 is surrounded by a spacing sleeve 10 and the legs are connected above the spacing sleeves 10 by a bar 11 terminating at the ends in clips 12 surrounding the respective legs 1 or 2, as the case may be. The clips 12 may be made fast to the legs of the respective arches by rivets 13 or otherwise, and the clips have wings 14 arranged on opposite sides of the respective bar 11 and are connected thereto by a bolt 15 elongated at one end beyond the clip to form a pintle for a guide roller 16.

At the upper ends of the two arches and connecting them is a shaft 17 carried at the ends by journal bearings 18 having side extensions 19 traversed by the respective arches and secured to such arches by set screws 20. The shaft 17 adjacent to each bearing 18 is enlarged into or provided with a drum 21, to each of which latter is secured the corresponding ends of two chains 22 so as to be wound thereon. The two chains on each drum 21 diverge and pass around respective guide rollers 16 and are connected to respective elongated eye bolts 23 extending through appropriate passages 24 in the base arches 6. Within the arches 6 the bolts 24 are connected to respective ends of cross bars 25, each having its extremities within the arches 5 at the corresponding ends of the frame, while between these arches the bars 25 carry other bars 26 extending parallel with the frames 1 and 2 and intermediate thereof and spaced apart a sufficient distance to engage the axles of an automobile between the wheels thereof.

In order that the bars 25, which are arranged transversely of the length of an automobile entering the lifting frame, may be normally out of the way, the floor 8 is provided with trenches 27 of sufficient depth to receive the bars 25, while the width and length of the trenches 27 are about equal to the corresponding dimensions of the bars, so that when the bars are lowered into the trenches there is no impediment to the movement of the automobile into the lifting frame or its movement therefrom. It will be understood, of course, that the trenches are not essential to the invention and the frame may be used without the trenches.

One end of the shaft 17 extends beyond the corresponding frame, which in the particular showing of the drawings is the frame 1, and is there provided with a drum 28 to which is connected one end of a chain 29. The other end of the chain 29 is connected to an eye 30 on a set collar 31 fast on a manipulating arm 32 having one end pivoted to one bar 11, while the other end of the lever 32 constitutes a handle 34 at a convenient position to be manipulated. The lever 32, which may be in the form of a rod or tube, extends through a guide 35 fast to one of the legs of one of the side frames, say, the frame 1. Pivoted to the guide 35 is a pendent latch member 36 having a manipulating-handle 37 and at the lower end provided with a notch 38 adapted to engage the lever 32.

In the normal position of the parts the bars 25 are within the trenches 27, while the hand lever 32 is elevated, since in this condition of the parts the chains 22 have been unwound to an extent from the drums 21 and the chain 29 is correspondingly wound on the drum 28. Under these conditions an automobile may be moved into the lifting frame until the wheels are on opposite sides of the two bars 25 or in any other relation to these bars, whereby the automobile is lodged about midway of the length of the frame in the direction of travel of the automobile into and out of the frame. Now the operator has but to apply downwardly directed force to the handle end 34 of the lever 32, whereby the chain 29 is drawn from the drum 28, causing the latter to rotate, and this rotation is imparted to the shaft 17 in a direction to wind the chains 22 simultaneously upon the drums 21, whereby the automobile is lifted to equal extents both at front and rear, and thereby becomes elevated until the lever 32 is below the latch 35, whereupon the latter is moved into overriding relation to the lever 32, and said lever becomes locked in the depressed position. This serves to hold the automobile in the elevated condition, thus relieving the tires from the weight of the automobile and the elevation may be sufficient to provide ample room under the automobile for inspection and repairs.

The device is of simple and strong construction being made largely of pipe and readily obtainable fittings, so that no difficulty is encountered in assembling the device from parts which may in most part be bought in the open market.

The automobile elevator structure requires but a single manipulating member movable through a comparatively limited distance, and this manipulating member acts upon a single windlass structure from which extend flexible divergent lifting devices which may be conveniently made of chain. These lifting devices are arranged at opposite sides of the path of the automobile, so as to be out of the way, while the ends of the bars to which they are connected are housed in and guided by the arch supports upon which the side members of the main frame are supported. Moreover, the arch supports serve as guards or fenders, since these parts may project to a sufficient distance one toward the other to prevent collision of the automobile with the upstanding parts of the frame of the elevating structure.

The cross braces 4 have been described as pipes connected to the arch members by couplings 3. Instead of this arrangement cross braces 4$^a$ may be provided, as shown in Fig. 6, with angle taper extensions 39 entering sleeves 40 embracing the legs of the frames 1 and 2. The taper extremities 39 wedge in the sleeves 40, thus holding the frames 1 and 2 in spaced relation and in order that the sleeves 40 may definitely retain the position in which they are placed, they are held by set screws 41.

What is claimed is:—

1. A device for lifting and supporting automobiles, comprising connected side frames spaced apart a distance to admit the passage of an automobile through the device from end to end, with each side frame composed of basic members and a frame structure rising therefrom and connected at the lower ends to said basic members, another frame disposed horizontally and comprising transverse and longitudinal beams with the longitudinal beams spaced apart transversely of the length of the device and normally located to underride the axle portions of the automobile and having the ends of the transverse beams entering the basic members, a windlass extending transversely across the top intermediate of the length of the device, flexible connections extending from the windlass to the end portions of each transverse beam of the second-named frame and along the connected side frames out of the path of the automobile, and windlass operating means at one side of the device at a lower level than the windlass and within reach of an operator.

2. A lifting structure for automobiles comprising side frames spaced apart by a distance sufficient to permit the passage of an automobile between the frames, arch basic supports for the side frames, transverse beams having the ends entering the arch supports, longitudinal beams connecting the transverse beams and spaced apart to underride the axles of an automobile between the wheels thereof, a windlass structure centrally located at the top of the side frames and connected to and sustaining the transverse bars, and a lever structure connected to the windlass and located at a lower level than said windlass and provided with means for the manipulation of the lever by an operator.

3. A lifting structure for automobiles, comprising side frames spaced apart by a distance sufficient to permit the passage of an automobile between the frames, arch basic supports for the side frames, transverse beams having the ends entering the arch supports, longitudinal beams connecting the transverse beams and spaced apart to underride the axles of an automobile between the wheels thereof, a windlass structure centrally located at the top of the side frames and connected to and sustaining the transverse bars, and a lever structure connected to the windlass and located at a lower level than said windlass and provided with means for the manipulation of the lever by an operator, one of the side frames being provided with a latch member for engaging the operating lever to hold the automobile in the elevated position.

4. An automobile lifting structure comprising arch side frames, connecting members for the arch frames near the top thereof and across the leg portions of each arch frame near the bottom thereof, arch basic supports for the arch frames, cross beams having the ends entering the arch basic supports, longitudinal beams on the cross beams and spaced apart by a distance less than the spread of the wheels of an automobile, a windlass structure centrally located at the crown portions of the arch frames, flexible strands extending from the windlass to the respective cross beams and including non-flexible members extending through and guided by the basic arch supports, a lever carried by one of the brace members, a drum on the windlass, a flexible strand extending from the lever to the drum and related thereto to cause winding of the first-named flexible strands on the windlass by the unwinding of the second named flexible strand from the drum, and latch means for holding the operating lever in the position to which it is moved to elevate an automobile.

5. A lifting structure for automobiles comprising side frames spaced apart by a distance sufficient to permit the passage of an automobile between the frames, arch basic supports for the side frames, transverse beams having the ends entering the arch supports, longitudinal beams connecting the transverse beams and spaced apart to underride the axles of an automobile between the wheels thereof, a windlass structure located at the top of the side frames and connected to and sustaining the transverse bars, and means for operating the windlass structure.

6. A lifting apparatus for automobiles comprising upright side frames spaced apart a distance sufficient to permit the passage of an automobile between the frames, a horizontal frame upon which the automobile is driven, arch supports for the side frames receiving the ends of the horizontal frame, chains connected to the horizontal frame and extending upwardly along the sides of the side frames, and a windlass structure at the top of the side frames upon which the chains are wound.

7. A lifting apparatus for automobiles comprising upright side frames spaced apart a distance sufficient to permit the passage of an automobile between the frames, a horizontal frame adapted to support the automobile, chains connected to the horizontal frame at the four corners and arranged vertically along the side frames, a shaft connecting the side frames at the top, a drum mounted upon said shaft at each end, said drums receiving the said chains, and means for rotating the shaft to wind the chains upon the said drums.

8. A lifting apparatus for automobiles, comprising upright side frames spaced apart a distance sufficient to permit the passage of an automobile between the frames, a horizontal frame adapted to support the automobile and arranged between the side frames, a windlass structure connecting the side frames at the top, chains wound upon the windlass and diverging therefrom along the side frames to the horizontal frame and connected to the latter near its ends, a lever mounted upon one of the side frames at a lower level than said windlass and having means for its manipulation by an operator, and a chain connected at one end to the lever and at the other end wound upon the windlass in a direction opposite to the winding of the first-named chains thereupon, whereby a single depression of the manipulating end of the lever causes a winding of the first-named chains upon the windlass to an extent to elevate an automobile resting on the horizontal frame to a desired height.

In testimony, that I claim the foregoing as my own, I have hereto affixed my signature in the presence of two witnesses.

HENRY C. KING.

Witnesses:
   THOMAS C. BAKER,
   HARVEY MARKHAM.